United States Patent
Mayo et al.

(10) Patent No.: US 7,022,767 B2
(45) Date of Patent: *Apr. 4, 2006

(54) ETHERIFIED CARBAMATE CROSSLINKING AGENTS AND THEIR USE IN CURABLE COMPOSITIONS, PARTICULARLY FILM-FORMING COMPOSITIONS

(75) Inventors: Michael A. Mayo, Pittsburgh, PA (US); Steven V. Barancyk, Wexford, PA (US); Jane N. Valenta, Pittsburgh, PA (US); Sherry M. Gaggini, Tarentum, PA (US); William A. Humphrey, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/772,978

(22) Filed: Feb. 5, 2004

(65) Prior Publication Data

US 2004/0162389 A1    Aug. 19, 2004

Related U.S. Application Data

(62) Division of application No. 10/146,856, filed on May 16, 2002, now Pat. No. 6,716,953.

(51) Int. Cl.
*C08G 18/63*    (2006.01)

(52) U.S. Cl. .................. 525/123; 525/127; 525/440; 525/406; 525/457; 525/528; 528/49; 528/73; 252/182.27; 544/222; 560/25

(58) Field of Classification Search ......... 525/123, 525/127, 440, 406, 457, 528; 528/49, 73; 252/182.27; 544/222; 560/25

See application file for complete search history.

(56) References Cited

U.S. PATENT DOCUMENTS

| | | | |
|---|---|---|---|
| 2,956,964 A | 10/1960 | Christenson et al. | 260/15 |
| 3,464,938 A | 9/1969 | Nordstrom | 260/21 |
| 3,479,328 A | 11/1969 | Nordstrom | 260/86.1 |
| 3,491,067 A | 1/1970 | Sellet | 260/75 |
| 4,485,222 A | 11/1984 | Parekh | 525/517 |
| 4,543,276 A | 9/1985 | Parekh | 427/388.3 |
| 5,336,566 A | 8/1994 | Rehfuss | 428/524 |
| 5,356,669 A | 10/1994 | Rehfuss et al. | 427/407.1 |
| 5,451,656 A | 9/1995 | Menovcik et al. | 528/288 |
| 5,508,379 A | 4/1996 | Menovcik et al. | 528/367 |
| 5,532,061 A | 7/1996 | Menovcik et al. | 428/423.1 |
| 5,593,733 A | 1/1997 | Mayo | 427/407.2 |
| 5,593,785 A | 1/1997 | Mayo et al. | 428/423.1 |
| 5,922,475 A | 7/1999 | Barancyk et al. | 428/482 |

*Primary Examiner*—Rachel Gorr
(74) *Attorney, Agent, or Firm*—Deborah M. Altman

(57) ABSTRACT

The present invention provides a composition of matter having the structure:

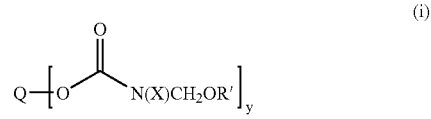

(i)

where Q is a multi-valent organic moiety containing isocyanurate functionality; X is H, —CH$_2$OH, or —CH$_2$OR'; R' is an alkyl or aryl group having from 1 to 12 carbon atoms; and y is at least 2. Also provided is a curable composition containing the composition of matter.

37 Claims, No Drawings

ETHERIFIED CARBAMATE CROSSLINKING AGENTS AND THEIR USE IN CURABLE COMPOSITIONS, PARTICULARLY FILM-FORMING COMPOSITIONS

This is a division of application Ser. No. 10/146,856, filed May 16, 2002 now U.S. Pat. No. 6,716,953.

FIELD OF THE INVENTION

The present invention relates to crosslinking agents having etherified carbamate functionality, and to curable compositions containing them.

BACKGROUND OF THE INVENTION

Coating compositions used in the original automotive equipment market are being called to more and more stringent performance requirements. Coating systems are expected to provide lasting weatherability, durability, resistance to acid etching, and mar resistance, while maintaining outstanding appearance properties. Coating systems used in certain applications, such as on plastic substrates, must also be flexible. Additionally, automotive coating compositions are expected to be available in environmentally friendly formulations.

Some coating compositions cured via acid-epoxy cure mechanisms, while providing excellent acid etch resistance, offer only marginal mar resistance. Conventional coating compositions cured with aminoplast crosslinking agents have been known for superior durability, but it has only been recently that aminoplast-cured coatings providing acid etch resistance have become available. Moreover, aminoplast-cured systems typically suffer from high photo-oxidation rates due to the breakdown of the aminotriazine ring inherently found in most aminoplast resins. Such degradation is due to prolonged exposure to ultraviolet light.

It would be desirable to provide crosslinking agents and curable compositions suitable for use as film-forming compositions in the automotive and industrial markets that overcome the drawbacks of the prior art, providing both appearance and performance properties now considered essential in automotive applications.

SUMMARY OF THE INVENTION

The present invention provides a reaction product of reactants comprising:
a) a polyisocyanate;
b) a hydroxyalkyl carbamate;
c) an aldehyde; and
d) at least one monohydric alcohol. The reaction product is suitable for use in a variety of curable compositions, which are also provided.

Additionally provided is a composition of matter comprising the structure:

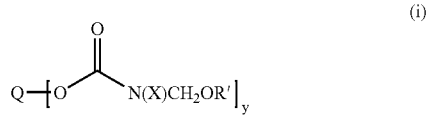

(i)

wherein Q is a multi-valent organic moiety containing urethane linkages; X is H, —CH$_2$OH, or —CH$_2$OR'; R' is an alkyl or aryl group having from 1 to 12 carbon atoms; and y is at least 2. The reaction product described above may have the structure (i).

DETAILED DESCRIPTION OF THE PREFERRED EMBODIMENTS

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The reaction product of the present invention is typically prepared by reacting together:
a) a polyisocyanate;
b) a hydroxyalkyl carbamate;
c) an aldehyde; and
d) at least one monohydric alcohol.

The polyisocyanate a) may be selected from one or more polyisocyanates, such as diisocyanates and triisocyanates including biurets and isocyanurates. Biurets of any suitable diisocyanate including 1,4-tetramethylene diisocyanate and 1,6-hexamethylene diisocyanate may be used as reactant a) in the preparation of the reaction product of the present invention. Also, biurets of cycloaliphatic diisocyanates, such as isophorone diisocyanate and 4,4'-methylene-bis-(cyclohexyl isocyanate), can be employed. Examples of suitable aralkyl diisocyanates from which biurets may be prepared are meta-xylene diisocyanate and α,α,α',α'-tetramethyl-meta-xylylene diisocyanate. The diisocyanates themselves may also be used as reactant a) in the preparation of the reaction product of the present invention.

Trifunctional isocyanates may also be used as reactant a), for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the trade name CYTHANE 3160 by CYTEC Industries, and DESMODUR N 3300, which is the isocyanurate of hexamethylene diisocyanate, available from Bayer Corporation. Specifically used polyisocyanates are cyclic isocyanates, particularly, isocyanurates of diisocyanates such as hexamethylene diisocyanate and isophorone diisocyanate.

The polyisocyanate used as reactant a) may also be one of those disclosed above, chain extended with one or more polyamines and/or polyols using suitable materials and techniques known to those skilled in the art.

In the preparation of the reaction product of the present invention, the polyisocyanate reactant a) is used in an amount of 5 to 70 percent by weight, based on the total weight of reactants used to prepare the reaction product.

The hydroxyalkyl carbamate used as reactant b) typically contains about 3 to about 7 carbon atoms. Examples include hydroxyethyl carbamate, hydroxypropyl carbamate, hydroxybutyl carbamate, and the like. Reaction products of ammonia and hydroxyl functional carbonates, such as glycerin carbonate, are also suitable. Hydroxypropyl carbamate and hydroxyethyl carbamate are most often used. Reactant b) is used in an amount of 1 to 60 percent by weight, based on the total weight of reactants used to prepare the reaction product.

The aldehyde c) most often used in the preparation of the reaction product of the present invention is formaldehyde. Other aldehydes, such as acetaldehyde, propanaldehyde, butyraldehyde, furfural, benzaldehyde, acrolein, methacrolein, and glyoxal are also suitable. The aldehyde c) is used in an amount of 1 to 60 percent by weight, based on the total weight of reactants used to prepare the reaction product.

Alkylol groups formed during the reaction of a), b), and c) are at least partially etherified by reaction with at least one monohydric alcohol d). Any monohydric alcohol can be employed for this purpose. Particularly suitable alcohols may have up to 12 carbon atoms, most typically have from 1 to 6 carbon atoms, and include methanol, ethanol, n-propanol, isopropanol, n-butanol, isobutanol, pentanol, hexanol, cyclohexanol, and others, as well as benzyl alcohol and other aromatic alcohols, cyclic alcohols, such as cyclohexanol, monoethers of glycols, and halogen-substituted or other substituted alcohols, such as 3-chloropropanol and butoxyethanol. Most commonly, methanol, isobutanol, and/or n-butanol are used.

In the preparation of the reaction product of the present invention, the monohydric alcohol d) is used in an amount of 1 to 70 percent by weight, based on the total weight of reactants used to prepare the reaction product.

The urethane oligomer or polymer having carbamate functional groups may be alkylolated by reaction with an aldehyde. Examples of suitable aldehydes include those mentioned above, with formaldehyde being most often used. Alkylolation may be performed in an aqueous or alcoholic medium, using techniques known to those skilled in the art; for example, at temperatures of about 10° C. to about 100° C. in aqueous medium, and about 10° C. to about 170° C. in organic medium.

The alkylolated polymer or oligomer may then optionally be etherified by reaction with an alcohol using conventional techniques. Suitable alcohols contain about 1 to about 12 carbon atoms and include methanol, ethanol, n-propanol, isopropanol, n-butanol, isobutanol, pentanol, and cyclohexanol. Isobutanol, n-butanol, and methanol are most often used.

Alkylolation and etherification of the carbamate functional polymer or oligomer may be done in one step by reacting the carbamate functional polymer or oligomer with an aldehyde in an acidic, alcoholic medium such that the alcohol solvent which is in stoichiometric excess participates in the reaction. Alternatively, the alkylolation may first be carried out in a basic aqueous or alcoholic medium. After the alkylolation reaction is complete, the reaction mixture is treated with acid in order to neutralize the base and establish an acidic pH. If the reaction was run under aqueous conditions, the etherifying alcohol can be added to the reaction mixture prior to acidification. The reaction mixture is then typically heated to accomplish the etherification reaction.

In either of the scenarios outlined above, if the etherifying alcohol is immiscible with water the reaction can be heated to reflux and water can be removed via azeotropic distillation in order to drive the equilibrium in favor of the etherification reaction. Partial etherification is possible by stopping the reaction once an amount of water is removed corresponding to the desired degree of etherification. If the alcohol is miscible with water (e.g. methanol) the reaction mixture is simply heated and held until the desired degree of etherification or system equilibrium is reached. If desired, water can be stripped from the reaction mixture with the alcohol once the reaction is complete at a neutral or slightly basic pH to prevent gelling the reaction product.

In one embodiment of the invention there is provided a composition of matter comprising the structure:

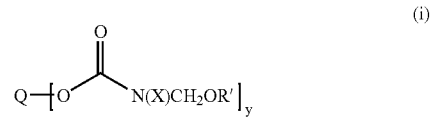

(i)

wherein Q is a multi-valent organic moiety, containing urethane linkages; X is H, —CH$_2$OH, or —CH$_2$OR'; R' is an alkyl or aryl group having from 1 to 12 carbon atoms; and y is at least 2. The reaction product described above may have the structure (i). As mentioned earlier, R' is typically an alkyl or aryl group having from 1 to 12 carbon atoms, and may be linear or branched, cyclic, aralkyl, or alkaryl, and may contain heteroatom substituents. R' is most often the residue of a monohydric alcohol and contains from 1 to 6 carbon atoms.

The moiety Q typically is derived from a polyisocyanate and contains at least 2 urethane linkages. The moiety Q may contain groups of the structure —N—CH$_2$—OR', formed during etherification of the urethane linkages. Q may contain cyclic moieties, particularly when derived from isocyanurates. In a specific embodiment, Q has the structure:

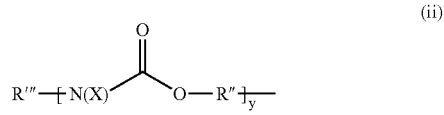

(ii)

wherein X and y are as described above, R" is a divalent group, and R'" is a residue of a polyisocyanate. R" may be linear or branched, cyclic, alkaryl or aralkyl and may contain heteroatom substituents. R" is most often an alkylene group having from 1 to 6 carbon atoms. R'" is most often a residue of an isocyanurate.

In a separate embodiment of the present invention, the reaction product or composition of matter described above is present as a crosslinking agent in a curable composition comprising:

a) the reaction product or composition of matter described above, typically present in an amount of 1 to 99, often 1 to 50 percent by weight based on the total weight of resin solids in the curable composition; and b) at least one polymer having functional groups that are reactive with the reaction product or composition of matter of a), typically present in a total amount of 1 to 99, often 20 to 85 percent by weight based on the total weight of resin solids in the curable composition. The composition of this embodiment is suitable for use as a curable film-forming composition.

Useful functional polymers for use as component b) in the curable composition of the present invention include vinyl polymers, acrylic polymers, polyesters, including alkyds, polyurethanes, polyethers and copolymers, and mixtures thereof. As used herein, the term "polymer" is meant to refer to oligomers and both homopolymers and copolymers. Unless stated otherwise, as used in the specification and the claims, molecular weights are number average molecular weights for polymeric materials indicated as "$M_n$" and obtained by gel permeation chromatography using a polystyrene standard in an art-recognized manner.

The polymer (b) may comprise reactive functional groups selected from hydroxyl, carboxylic acid, amide, thiol, urea, carbamate, thiocarbamate, and mixtures thereof. In one embodiment of the present invention, the polyfunctional polymer (b) comprises carbamate functional groups of the structure:

(iii)

wherein Z is H, or an alkyl or aryl group containing 1 to 12 carbon atoms and may be linear or branched, cyclic, alkaryl or aralkyl and may contain heteroatom substituents.

Suitable functional polymers include acrylic polymers such as copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic polymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. The acrylic polymer can be prepared with N-(alkoxymethyl)acrylamides and N-(alkoxymethyl) methacrylamides, which result in self-crosslinking acrylic polymers.

Hydroxyl functional groups may be incorporated into the acrylic polymer by using one or more ethylenically unsaturated beta-hydroxy ester functional monomers. Such monomers can be prepared from ethylenically unsaturated, epoxy functional monomers reacted with carboxylic acids having from about 1 to about 20 carbon atoms, often from about 13 to about 20 carbon atoms, or from ethylenically unsaturated acid functional monomers reacted with epoxy compounds containing at least 4 carbon atoms that are not polymerizable with the ethylenically unsaturated acid functional monomer.

Useful ethylenically unsaturated, epoxy functional monomers include glycidyl acrylate, glycidyl methacrylate, allyl glycidyl ether, methallyl glycidyl ether, 1:1 (molar) adducts of ethylenically unsaturated monoisocyanates such as meta-isopropenyl-alpha,alpha-dimethylbenzyl isocyanate with hydroxy functional monoepoxides such as glycidol, and glycidyl esters of polymerizable polycarboxylic acids such as maleic acid, fumaric acid, and crotonic acid. Most often used are the epoxy-functional acrylates such as glycidyl acrylate, epoxy functional methacrylates such as glycidyl methacrylate, or mixtures thereof. Glycidyl acrylate and glycidyl methacrylate are most often used.

Examples of saturated carboxylic acids include saturated monocarboxylic acids such as those which are noncrystalline at room temperature, particularly those having branched structures. Isostearic acid is most often used. As used herein, the term "saturated" as in the phrase "saturated monocarboxylic acid" is intended to denote the absence of ethylenic unsaturation but is not intended to exclude aromatic unsaturation as found, for example, in a benzene ring.

Useful ethylenically unsaturated acid functional monomers include monocarboxylic acids such as acrylic acid, methacrylic acid, and crotonic acid; dicarboxylic acids such as itaconic acid, maleic acid, and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation which would participate in free radical-initiated polymerization with the unsaturated acid functional monomer. Useful epoxy compounds include 1,2-pentene oxide, styrene oxide and glycidyl esters or ethers, typically containing from 8 to 30 carbon atoms, such as butyl glycidyl ether, octyl glycidyl ether, phenyl glycidyl ether, and para-(tertiary butyl)phenyl glycidyl ether. Most often-used glycidyl esters include those of the structure:

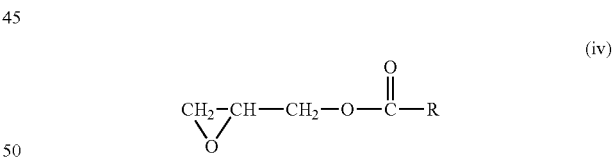

(iv)

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include those commercially available from Shell Chemical Company under the trademark CARDURA® E; and from Exxon Chemical Company under the trademark GLYDEXX®-10.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other useful carbamate functional monomers are disclosed in U.S. Pat. No. 5,098,947, which is incorporated herein by reference.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

The acrylic polymer can be prepared by solution polymerization techniques. In conducting the reaction, the monomers are heated, typically in the presence of a free radical initiator such as organic peroxides or azo compounds, for example, benzoyl peroxide or N,N-azobis(isobutyronitrile) and optionally a chain transfer agent, in an organic solvent in which the ingredients as well as the resultant polymer product are compatible. Typically, the organic solvent is charged to a reaction vessel and heated to reflux, optionally under an inert atmosphere. The monomers and other free radical initiator are added slowly to the refluxing reaction mixture. After the addition is complete, some additional initiator may be added and the reaction mixture held at an elevated temperature to complete the reaction.

The acrylic polymer typically has a number average molecular weight of from about 900 to 13,000, often from about 1000 to 5000 as determined by gel permeation chromatography using a polystyrene standard. The acrylic polymers have functional group equivalent weights less than about 5000, often within the range of about 140 to 2500, based on equivalents of reactive functional groups. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and yield a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in a hydroxyl-containing polymer.

As discussed above, the functional polymer used in the curable film-forming composition of the present invention may alternatively be an alkyd resin or a polyester. Such polymers can be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane, 2,2,4-trimethyl-1,3-pentanediol, 2,2-dimethyl-3-hydroxypropyl-2,2-dimethyl-3-hydroxypropionate, pentaerythritol, and the like. Suitable polycarboxylic acids include succinic acid, adipic acid, azelaic acid, sebacic acid, maleic acid, fumaric acid, phthalic acid, tetrahydrophthalic acid, hexahydrophthalic acid, methylhexahydrophthalic acid, and trimellitic acid. Besides the polycarboxylic acids mentioned above, functional equivalents of the acids such as anhydrides where they exist or lower alkyl esters of the acids such as methyl esters can be used. Polyesters prepared from polycarboxylic acids and epoxides or polyepoxides as known to those skilled in the art may also be used. Where it is desired to produce air-drying alkyd resins, suitable drying oil fatty acids can be used and include those derived from linseed oil, soya bean oil, tall oil, dehydrated castor oil, or tung oil. The polyesters and alkyd resins can contain a portion of free hydroxyl and/or carboxyl groups that are available for further crosslinking reactions by adjusting the stoichiometry of the reactants used to prepare the polyester or alkyd.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups, such as amide, thiol, urea, and thiocarbamate, may be incorporated into the polyester or alkyd resin as desired using suitably functional reactants if available, or conversion reactions as necessary to yield the desired functional groups. Such techniques are known to those skilled in the art.

A particularly suitable polyester may be prepared from trimethylol propane, neopentyl glycol, 2,2,4-trimethyl-1,3-pentanediol, and hexahydrophthalic anhydride, transcarbamoylated with methyl carbamate. The preparation of this polyester is described in the examples that follow.

The polyester polymer typically has a number average molecular weight of from about 600 to 3000, often from about 800 to 1500 as determined by gel permeation chromatography using a polystyrene standard, and a functional group equivalent weight within the range of about 200 to 1500, often about 300 to 400, based on equivalents of reactive pendant or terminal functional groups.

Polyurethanes can also be used as the functional polymer in the curable film-forming composition. Useful polyurethanes include polymeric polyols which are prepared by reacting polyhydric alcohols, polyester polyols or acrylic polyols, such as those mentioned above or polyether polyols, such as those mentioned below with a polyisocyanate such that the OH/NCO equivalent ratio is greater than 1:1 so that free hydroxyl groups are present in the product. Alternatively, isocyanate functional polyurethanes may be prepared using similar reactants in relative amounts such that the OH/NCO equivalent ratio is less than 1:1, and the isocyanate functional polyurethanes may be modified to contain functional groups that are reactive with the reaction product or composition of matter of a).

The organic polyisocyanate that is used to prepare the polyurethane polymer can be an aliphatic or aromatic polyisocyanate or mixtures thereof. Diisocyanates are most often used, although higher polyisocyanates can be used in place of or in combination with diisocyanates. Examples of suitable aromatic diisocyanates include 4,4'-diphenylmethane diisocyanate and toluene diisocyanate. Examples of suitable aliphatic diisocyanates include straight chain aliphatic diisocyanates such as 1,6-hexamethylene diisocyanate. Also, cycloaliphatic diisocyanates such as isophorone diisocyanate and 4,4'-methylene-bis-(cyclohexyl isocyanate) can be used. Examples of suitable higher polyisocyanates include 1,2,4-benzene triisocyanate and polymethylene polyphenyl isocyanate. Additional polyisocyanates such as those disclosed above in the preparation of the reaction product of the present invention may also be used.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, and thiocarbamate may be incorporated into the polyurethane as desired using suitably functional reactants if available, or conversion reactions as necessary to yield the desired functional groups. Such techniques are known to those skilled in the art.

The polyurethane typically has a number average molecular weight of from about 600 to 3000, often from about 800 to 1500 as determined by gel permeation chromatography using a polystyrene standard. The polyurethanes typically have functional group equivalent weights within the range of about 200 to 1500, based on equivalents of reactive functional groups.

Examples of polyether polymers used in the curable composition of the present invention are polyalkylene ether polyols including those having the following structural formula:

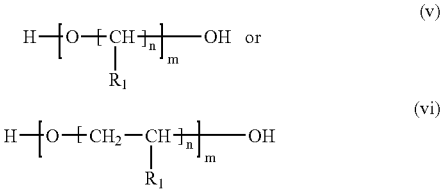

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene)glycols, poly(oxytetraethylene)glycols, poly(oxy-1,2-propylene)glycols, and poly(oxy-1,2-butylene)glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality that can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Polyethers used most often include those sold under the names TERATHANE and TERACOL, available from E.I. du Pont de Nemours and Company, Inc., and POLYMEG, available from Q O Chemicals, Inc., a subsidiary of Great Lakes Chemical Corp.

Most often, pendant or terminal carbamate functional groups may be incorporated into the polyethers by a transcarbamoylation reaction as described above.

Other functional groups such as amide, thiol, urea, and thiocarbamate may be incorporated into the polyether as desired using suitably functional reactants if available, or conversion reactions as necessary to yield the desired functional groups. The polyether polymer typically has a number average molecular weight of from about 500 to 5000, more typically from about 900 to 3200 as determined by gel permeation chromatography using a polystyrene standard, and an equivalent weight of within the range of 140 to 2500, often about 500, based on equivalents of reactive pendant or terminal functional groups.

The curable composition may further include one or more auxiliary crosslinking agents such as free and/or capped polyisocyanates; triazine compounds of the formula: $C_3N_3(NHCOXR)_3$, wherein X is nitrogen, oxygen, sulfur, phosphorus, or carbon, and R is a lower alkyl group having one to twelve carbon atoms, or mixtures of lower alkyl groups, and conventional aminoplast crosslinking agents.

Suitable polyisocyanates include any of those disclosed above. Any suitable aliphatic, cycloaliphatic, or aromatic alkyl monoalcohol or phenolic compound may be used as a capping agent for the polyisocyanate. Examples include lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include pyrazoles such as 3,5-dimethyl pyrazole, oximes such as methyl ethyl ketoxime, acetone oxime and cyclohexanone oxime, lactams such as epsilon-caprolactam, and secondary amines such as dibutyl amine.

Triazine compounds of the type mentioned are described in U.S. Pat. No. 4,939,213.

Conventional aminoplast crosslinking agents are well known in the art and are described in U.S. Pat. No. 5,256,452 at column 9, lines 10–28. Useful aminoplast resins are based on the addition products of formaldehyde with an amino- or amido-group carrying substance. Condensation products obtained from the reaction of alcohols and formaldehyde with melamine, urea or benzoguanamine are most common and most often used herein. While the aldehyde employed is most often formaldehyde, other similar condensation products can be made from other aldehydes, such as acetaldehyde, crotonaldehyde, acrolein, benzaldehyde, furfural, glyoxal, and the like.

Condensation products of other amines and amides can also be used, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, and 2-mercapto-4,6-diaminopyrimidine. The aminoplast crosslinking agent may be monomeric or polymeric and may be partially or fully alkylated.

Generally, the auxiliary crosslinking agent is present in an amount ranging from about 0 to about 50 weight percent on a basis of total resin solids of the curable composition, often about 5 to about 40 weight percent.

In a separate, particular embodiment of the present invention, the reaction product or composition of matter described above may be used in a curable composition comprising:

a) the reaction product or composition of matter described above, present as a crosslinking agent in an amount of 1 to 30 percent by weight based on the total weight of resin solids in the curable composition;

b) an aminoplast crosslinking agent, present in an amount of 15 to 50 percent by weight based on the total weight of resin solids in the curable composition; and c) an acrylic polymer having functional groups that are reactive with the crosslinking agents of a) and b), present in an amount of 20 to 84 percent by weight based on the total weight of resin solids in the curable composition.

Generally, the crosslinking agent a) is present in an amount ranging from about 1 to about 30 weight percent on a basis of total resin solids of the curable composition as noted above, often about 5 to about 15 weight percent.

The curable composition further includes an aminoplast crosslinking agent b). Useful aminoplast resins include any of those disclosed above.

Generally, the aminoplast crosslinking agent b) is present in an amount ranging from about 15 to about 50 weight percent on a basis of total resin solids of the curable composition as noted above, often about 20 to about 35 weight percent.

The acrylic polymer c) is typically present in an amount ranging from about 20 to about 84 weight percent on a basis of total resin solids of the curable composition as noted above, often about 45 to about 70 weight percent.

The acrylic polymer c) is typically a copolymer of one or more alkyl esters of acrylic acid or methacrylic acid optionally together with one or more other polymerizable ethylenically unsaturated monomers as discussed above.

The acrylic polymer often has beta-hydroxy ester functionality and, in a specific embodiment, comprises a polymer of:

1) an ethylenically unsaturated, beta-hydroxy ester functional monomer;

2) about 5 to about 50, often 10 to 30, percent by weight, based on total solid weight of monomers used to prepare the polymer, of a polymerizable ethylenically unsaturated, hydroxyalkyl functional monomer different from 1);

3) about 0 to about 40 percent by weight based on the total solid weight of monomers used to prepare the monomer of a vinyl aromatic monomer;

4) about 0 to about 60, often 0 to 30, percent by weight, based on the total solid weight of monomers used to prepare the polymer, of at least one alkyl ester of acrylic acid or methacrylic acid; and 5) about 0 to about 20 percent by weight, based on the total solid weight of monomers used to prepare the polymer, of at least one ethylenically unsaturated monomer different from 1), 2), 3), and 4) above.

The beta-hydroxy ester functional monomer can be prepared from ethylenically unsaturated, epoxy functional monomers reacted with carboxylic acids having from about 1 to about 20 carbon atoms, or from ethylenically unsaturated acid functional monomers reacted with epoxy compounds containing at least 4 carbon atoms that are not polymerizable with the ethylenically unsaturated acid functional monomer. Such monomers are discussed above.

The beta-hydroxy ester functional monomer is typically present in the polymer in an amount of 1 to about 70 percent, often about 10 to about 70, more often about 20 to about 55 percent by weight, based on the total solid weight of monomers used to prepare the polymer.

Hydroxyethyl methacrylate is the most often used hydroxyalkyl monomer 2), and is typically present in an amount of about 10 to about 30 percent by weight, based on the total solid weight of monomers used to prepare the polymer. Suitable vinyl aromatic monomers and acrylic or methacrylic acid esters include those disclosed above.

In addition to hydroxyl groups, the polymer may have carbamate functional groups. Such groups may be incorporated into the polymer as discussed above.

The acrylic polymer used in the curable composition typically has a weight average molecular weight of about 2,000 to about 25,000, often 3,000 to 10,000 as determined by gel permeation chromatography using a polystyrene standard. The hydroxyl equivalent weight of the polymer is generally about 200 to about 800, often about 300 to about 500.

In each embodiment of the present invention, the curable compositions may optionally contain a mixture of other polymers separate from and in addition to the functional group-containing polymer(s) that are reactive with the crosslinking agent(s). The additional polymer(s) may or may not contain functional groups and may be selected from acrylic polymers, polyester polymers, which are most often used, polyurethane polymers, polyether polymers, polysiloxane polymers, polyolefins, and mixtures thereof. These polymers are often hydroxyl or carbamate functional and may be prepared as discussed above. Other functional groups include epoxide, silane, carboxylic acid, anhydride, and the like.

When the curable compositions of the present invention contain additional functional group-containing polymers, the additional polymers are present in total amounts up to 50, often about 5 to 35, more often 5 to 20 percent by weight based on the total weight of resin solids in the curable composition.

In each embodiment of the present invention, the curable composition may further include one or more auxiliary crosslinking agents as disclosed above, such as free and/or capped polyisocyanates; triazine compounds of the formula: $C_3N_3(NHCOXR)_3$, wherein X is nitrogen, oxygen, sulfur, phosphorus, or carbon, and R is a lower alkyl group having one to twelve carbon atoms, or mixtures of lower alkyl groups; and conventional aminoplast crosslinking agents.

Other optional ingredients, such as catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from about 0.1 to 5 percent by weight based on total weight of resin solids of the curable composition. Suitable catalysts include acid functional catalysts known to those skilled in the art as useful in aminoplast-cured compositions, such as phenyl acid phosphate, para-toluenesulfonic acid, dodecylbenzene sulfonic acid, and the like.

The curable compositions of the present invention may be used as curable film-forming compositions and may contain color pigments conventionally used in surface coatings and may be used as high gloss monocoats; that is, high gloss pigmented coatings. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

In specific embodiments of the present invention, suitable polymers or oligomers containing functional groups reactive with the crosslinking agent(s) may be used (either by themselves, combined with one another, or in combination with other polymers or oligomers) to provide coatings with flexibility acceptable for use over flexible plastic substrates. Nonlimiting examples of such polymers or oligomers are described in the examples below. By flexible plastic substrates is meant any of the common thermoplastic or thermoset synthetic materials, which would include but not be limited to polyethylene, polypropylene, thermoplastic polyolefin (TPO), reaction injected molded polyurethane (RIM), and thermoplastic polyurethane (TPU).

A specific application of the present invention is as a protective and decorative coating for pigmented plastic substrates, or mold-in-color (MIC) plastic. The curable compositions of the present invention may be applied as a high gloss clear monocoat directly to the pigmented plastic or applied over a clear adhesion promoter or clear primer which is on the surface of the pigmented plastic. One example of a clear adhesion promoter is MPP-4205 and is available from PPG Industries, Inc.

The curable compositions of the present invention are additionally often used as clear coats in multi-component composite coating compositions such as color-plus-clear composite coating compositions. A color-plus-clear composition typically comprises a base coat deposited from a pigmented or colored film-forming composition, and a transparent topcoat (clear coat) applied over the base coat.

The multi-component composite coating compositions can be applied to various substrates to which they adhere, including wood, metals, glass, cloth, polymeric substrates, and the like. They are particularly useful for coating metals and elastomeric substrates that are found on motor vehicles. The compositions can be applied by conventional means including brushing, dipping, flow coating, spraying, and the like, but they are most often applied by spraying. The usual spray techniques and equipment for air spraying and electrostatic spraying and either manual or automatic methods can be used.

First, a base coat composition is applied to the surface of the substrate to be coated. The base coat composition can be waterborne, solventborne or powdered, and typically includes a film-forming resin, crosslinking material (such as are discussed above), and pigment. Non-limiting examples of suitable base coat compositions include waterborne base coats for color-plus-clear composites such as are disclosed in U.S. Pat. Nos. 4,403,003; 4,147,679; and 5,071,904, each of which is incorporated by reference herein.

After application of the base coat to the substrate, there is typically a drying or flash-off period allowed prior to the application of the clear coat. The purpose of this period is to evaporate at least a portion of the solvent or water from the base coat film. The flash-off conditions may vary by time, temperature, and/or humidity, depending on the particular base coat composition, the desired appearance, and properties of the final film. Typical times are from 1 to 15 minutes at a temperature between 70° F. and 250° F. (21.1° C. and 121.1° C.) More than one base coat layer and multiple topcoat layers may be applied to the substrate to develop optimum appearance. Typically, the base coat thickness ranges from about 0.1 to about 5 mils (about 2.54 to about 127 microns), and often about 0.4 to about 1.5 mils (about 10.16 to about 38.1 microns) in thickness.

After application of the base coat, the topcoat described in detail above is applied. The topcoat coating composition can be applied to the surface of the base coat by any of the coating processes discussed above for applying the base coat coating composition to the substrate. The coated substrate is then heated to cure the coating layers. In the curing operation, solvents are driven off and the film-forming materials of the clear coat and the base coat are each crosslinked. The heating or curing operation is usually carried out at a temperature in the range of from 160° F.–350° F. (71° C.–177° C.) but, if needed, lower or higher temperatures may be used as necessary to activate crosslinking mechanisms. The thickness of the clear coat usually ranges from about 0.5 to about 5 mils (about 12.7 to about 127 microns), often about 1.0 to about 3 mils (about 25.4 to about 76.2 microns).

As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01 N, and sample measurements occur every two seconds. The mode of deformation, glass transition temperature, and crosslink density of the sample can be determined according to this method. Higher crosslink density values indicate a higher degree of crosslinking in the coating.

The curable compositions of the present invention, when used as film-forming compositions, demonstrate improved acid resistance and decreased photo-oxidation rates when compared to similar compositions that do not contain the reaction product or composition of matter described above, but instead are formulated with conventional aminoplast crosslinking agents. Not intending to be bound by any theory, it is believed that triazine rings present in conventional aminoplast crosslinking agents in coating compositions undergo photo-oxidation when exposed to ultraviolet radiation, leading to degradation of a cured film. Curable compositions of the present invention, containing the reaction product or composition of matter of the present invention, do not photo-oxidize as rapidly as conventional compositions.

The determination of acid resistance of a coating may be performed as follows:

Coated test panels measuring at least 4"×8" (10.16 cm×20.32 cm) are exposed in Jacksonville, Fla. from the last week of May through the last week of August of a calendar year. This is the standard location and exposure period (summer months) established by the North American automobile manufacturers. Upon exposure completion, the panels are hand washed with soap and water, and then rinsed with water. The rinse water is removed by squeegee, and then the panels are allowed to dry at room temperature. The panels are rated on a scale of 0 to 10 against a set of reference standards comparable to those used by General Motors Company. A rating of '0' is outstanding, with no visible etching or waterspotting. The severity of etch steadily increases up through the rating of '10', which is severe etching and waterspotting. The determination of the photo-oxidation rate of a coating may be performed according to Ford Motor Company's Exterior Paint Weathering Test Method PA-0148, DVM-5867.

The present invention will further be described by reference to the following examples. The following examples are merely illustrative of the invention and are not intended to be limiting. Unless otherwise indicated, all parts are by weight.

EXAMPLE A

A butylated, etherified carbamate crosslinking agent was prepared from the following ingredients:

| Ingredients | Wt. in grams |
|---|---|
| Charge 1 | |
| DESMODUR N 3300[1] | 873.0 |
| Dibutyltin dilaurate | 0.21 |
| Methyl isobutyl ketone | 675.0 |
| Charge 2 | |
| Hydroxypropyl carbamate | 535.50 |
| Charge 3 | |
| Butanol | 1665.0 |
| FORMCEL 53% n-butanol/40% formaldehyde solution[2] | 675.0 |
| Phosphoric acid (85% solution) | 9.00 |

The ingredients of Charge 1 were added to a flask equipped with an overhead stirrer, reflux condenser, thermocouple, and $N_2$ inlet and heated to 60° C. Charge 2 was then added over a period of 2 hours, maintaining the temperature between 60° C. and 65° C. and then held for 2 hours. After the hold, a small amount of isocyanate was detected by IR spectroscopy; hydroxypropyl carbamate (5 g) was added to react off the residual isocyanate groups. After IR spectroscopy determined that the isocyanate was completely consumed, the flask was equipped for simple vacuum distillation and methyl isobutyl ketone was stripped from the reaction mixture under reduced pressure at s temperature between 67° C. and 107° C. Charge 3 was then added to the reaction mixture in the order given and the flask was equipped with a reflux condenser and a Dean Stark trap filled with butanol. The reaction was reheated to reflux and $H_2O$ was removed by azeotropic distillation. Reflux conditions were maintained until 182 g of $H_2O$ was collected. The resulting resin had a measured solids content (110° C., 1 hour) of 52.5%, a Gardner-Holt viscosity of F, a number average molecular weight of 4772, and a weight average molecular weight of 6867 as determined by gel permeation chromatography using a polystyrene standard.

EXAMPLE B

A carbamate functional urethane resin was prepared from the following ingredients:

| Ingredients | Wt. in grams |
|---|---|
| Charge 1 | |
| DESMODUR N 3300[1] | 1164.0 |
| Dibutyltin dilaurate | 0.30 |
| DOWANOL PM acetate[3] | 480.0 |
| Charge 2 | |
| Hydroxypropyl carbamate | 749.7 |
| Charge 3 | |
| Isobutanol | 1332.0 |

The ingredients of Charge 1 were added to a flask equipped with an overhead stirrer, reflux condenser, thermocouple, and $N_2$ inlet and heated to 60° C. Charge 2 was then added over a period of 3.5 hours, maintaining the temperature between 60° C. and 65° C. and then held for 1.75 hours. IR spectroscopy determined that the isocyanate was completely consumed. The reaction mixture was then thinned with Charge 3. The resulting resin had a measured solids content (110° C., 1 hour) of 54.1%, a Gardner-Holt viscosity of O-, a number average molecular weight of 1782, and a weight average molecular weight of 2442 as determined by gel permeation chromatography using a polystyrene standard.

EXAMPLE C

An isobutylated/butylated etherified carbamate crosslinking agent was prepared from the following ingredients:

| Ingredients | Wt. in grams |
|---|---|
| DESMODUR N 3300/hydroxypropyl carbamate adduct solution in DOWANOL PM acetate and isobutanol of Example B | 372.0 |
| Isobutanol | 177.6 |
| FORMCEL 53% n-butanol/40% formaldehyde solution[2] | 90.0 |
| Phosphorous acid | 3.06 |

The ingredients were added to a flask equipped with an overhead stirrer, reflux condenser, Dean Stark trap filled with isobutanol, thermocouple, and $N_2$ inlet. The reaction mixture was heated to reflux (101° C.), at which time $H_2O$ began to be collected in the Dean Stark trap. As $H_2O$ evolution progressed the temperature of the reaction mixture was increased in stages in order to maintain reflux. The reaction mixture was thus held for 3 hours from the time of initial reflux onset, at which time 22 g of $H_2O$ had been collected and a temperature of 111° C. had been attained. The resulting resin had a measured solids content (110° C., 1 hour) of 41.1%, a Gardner-Holt viscosity of A-B, a number average molecular weight of 3070, and a weight average molecular weight of 6192 as determined by gel permeation chromatography using a polystyrene standard.

EXAMPLE D

A carbamate functional urethane resin was prepared from the following ingredients:

| Ingredients | Wt. in grams |
|---|---|
| Charge 1 | |
| DESMODUR N 3300[1] | 1164.0 |
| Dibutyltin dilaurate | 0.30 |
| DOWANOL PM acetate[3] | 480.0 |
| Charge 2 | |
| Hydroxypropyl carbamate | 749.7 |
| Charge 3 | |
| Methanol | 888.0 |

The ingredients of Charge 1 were added to a flask equipped with an overhead stirrer, reflux condenser, thermocouple, and $N_2$ inlet and heated to 60° C. Charge 2 was then added over a period of 2.8 hours, maintaining the temperature between 60° C. and 65° C. and then held for 3 hours. IR spectroscopy determined that the isocyanate was completely consumed. The reaction mixture was then thinned with Charge 3. The resulting resin had a measured solids content (110° C., 1 hour) of 59.4%, a Gardner-Holt viscosity of C-D, a number average molecular weight of 1753, and a weight average molecular weight of 2350 as determined by gel permeation chromatography using a polystyrene standard.

EXAMPLE E

A methylated, etherified carbamate crosslinking agent was prepared from the following ingredients:

| Ingredients | Wt. in grams |
|---|---|
| DESMODUR N 3300/hydroxypropyl carbamate adduct solution in DOWANOL PM acetate and methanol of Example D | 820.0 |
| Methanol | 37.4 |
| FORMCEL 55% formaldehyde/35% methanol solution[2] | 163.7 |
| Phosphoric acid (85% in $H_2O$) | 9.0 |

The ingredients were added to a flask equipped with an overhead stirrer, reflux condenser, thermocouple, and $N_2$ inlet. The reaction mixture was heated to reflux (76° C.–77° C.). This temperature was maintained and the progress of the reaction was periodically monitored by infrared spectroscopy. The reaction mixture was held at reflux for 5 hours, at which time no further changes in the infrared spectrum were evident. The resulting resin had a measured solids content (110° C., 1 hour) of 58.9%, a Gardner-Holt viscosity of B-C, a number average molecular weight of 1812, and a weight average molecular weight of 2796 as determined by gel permeation chromatography using a polystyrene standard.

EXAMPLE F

A carbamate functional polyester was prepared from the following ingredients:

| Ingredient | Wt. in grams |
|---|---|
| Charge 1 | |
| Polyester[4] | 6916.4 |
| Methyl carbamate | 1081.4 |
| Butyl stannoic acid | 14.4 |
| Triphenyl phosphite | 14.4 |
| DOWANOL PM[5] | 1297.7 |
| Charge 2 | |
| DOWANOL PM acetate | 1647.6 |
| Charge 3 | |
| DOWANOL PM | 1294.5 |

Charge 1 was added to a reactor equipped with an overhead stirrer, thermocouple, $N_2$ inlet, and reflux condenser, heated to reflux (141° C.), and held 1 hour. The reflux condenser was then removed and the flask was equipped for atmospheric distillation with a short packed column and thermocouple head temperature probe. Over a period of 3.8 hours the temperature was raised to 151° C. to maintain distillation at a head temperature <81° C. At this point, 422 g of distillate had been collected. Vacuum was then applied to the system to continue the distillation process. The temperature of the system was allowed to drop to 140° C.–141° C. while the pressure was reduced to maintain distillation. When a pressure of 60 mm Hg was obtained the reaction mixture was held at this pressure for 1 hour. The amount of distillate collected under vacuum was 1007 g. The reaction mixture was then sampled and the OH value of the resin was found to be 32.6. The reaction mixture was then thinned with Charge 2, followed by Charge 3. The resulting resin solution had a measured solids content (110° C., 1 hour) of 70.2%, a Gardner-Holt viscosity of Z1+, a final OH value (at 100% solids) of 37.4, a number average molecular weight of 1160, and a weight average molecular weight 2539 as determined by gel permeation chromatography using a polystyrene standard.

EXAMPLE G

A carbamate functional acrylic polymer was prepared from the following ingredients:

| Ingredient | Wt. in parts |
|---|---|
| Charge 1 | |
| Acrylic polyol[6] | 2910.0 |
| Charge 2 | |
| Methyl carbamate | 408.0 |
| DOWANOL PM[5] | 20.0 |
| Charge 3 | |
| Triphenylphosphite | 6.7 |
| Butyl stannoic acid | 5.6 |
| DOWANOL PM | 7.0 |
| Charge 4 | |
| Ethyl-3-ethoxyproprionate | 620.0 |

-continued

| Ingredient | Wt. in parts |
|---|---|
| Charge 5 | |
| DOWANOL PM | 620.0 |

Charges 1, 2 and 3 were added in order to a reactor equipped with an overhead stirrer, thermocouple, $N_2$ inlet, and reflux condenser, heated to reflux (135° C.), and held 1 hour. The reactor was then converted over to atmospheric distillation with a packed column. Over a period of 3 hours the temperature was raised to 140° C. to maintain distillation. At this point, 67 parts of distillate had been collected. Vacuum was then applied to the system to continue the distillation process. The temperature of the system was held between 132° C. and 143° C. while the pressure was gradually reduced to maintain distillation until a reactor pressure of 36 mm Hg was obtained. The amount of distillate collected under vacuum was 769 parts. The reaction mixture was sampled and found to have an OH value of 42.5. Vacuum was broken and Charge 4 was added to the reaction mixture, followed by Charge 5. The resulting resin solution had a measured solids content (110° C., 1 hour) of 64.3%, a Gardner-Holt viscosity of Z–, a number average molecular weight of 2999, and a weight average molecular weight 8434 as determined by gel permeation chromatography using a polystyrene standard.

EXAMPLE H

A carbamate functional polyether was prepared from the following ingredients:

| Ingredient | Weight in grams |
|---|---|
| TERATHANE 1000[7] | 1400.2 |
| Methyl carbamate | 210.3 |
| Butyl stannoic acid | 4.9 |
| Triphenylphosphite | 3.2 |
| DOWANOL PM | 269.7 |

[7]Polytetramethylene glycol having an $M_n$ of 950 to 1050 and an OH value of 7 to 118, available from E.I. du Pont de Nemours and Co., Inc.

A suitable reactor was charged with the above ingredients and equipped with a thermocouple, overhead stirrer, nitrogen inlet and a reflux condenser. The material was heated to 143° C. under a nitrogen blanket. At this temperature reflux was observed; the reaction mixture was held at this temperature for one hour. After the hold period was complete, the reaction mixture was cooled to 135° C., the reflux condenser was removed, and the reactor equipped for distillation (short packed column, still head, thermocouple, condenser, and receiver flask) at atmospheric pressure. Distillate began to come over at 141° C.; the temperature was gradually raised to 155° C. to maintain distillation. At this point 79.3 g of distillate had been collected. The reaction mixture was then cooled to 140° C. and equipped for simple vacuum distillation (still head, thermocouple, condenser, vacuum adapter, receiver flask). Distillation was resumed under reduced pressure; the pressure inside the reactor was gradually reduced to maintain distillation until a reactor pressure of 60 mm Hg was attained. When the distillation was essentially stopped, the reaction mixture was sampled and the hydroxyl value found to be acceptable. The additional distillate collected totaled 258.3 g. The contents of the reactor were then poured out. The resulting material was a slightly hazy liquid when warm with a color of 40 as measured on the APHA scale; it solidified to a soft, white, waxy opaque material upon standing at ambient temperature. The final material was found to have a hydroxyl value of 15.8, a measured solids of 98.4%, a weight average molecular weight of 3384, and a number average molecular weight of 1515 as determined by gel permeation chromatography using a polystyrene standard.

EXAMPLE I

A siloxane polyol was prepared from the following ingredients:

| Ingredient | Wt. in parts |
|---|---|
| Charge 1 | |
| Trimethylolpropane monoallyl ether | 131.5 |
| Charge 2 | |
| MASILWAX BASE[8] | 93.2 |
| Charge 3 | |
| Chloroplatinic acid | 0.0047 |
| Toluene | 0.23 |
| Isopropanol | 0.07 |

[8]Reactive silicone prepolymer available from BASF Surfactants.

To a suitable reaction vessel equipped with an overhead stirrer, thermocouple, reflux condenser, and $N_2$ inlet, Charge 1 and an amount of sodium bicarbonate equivalent to 20 to 25 ppm of total Charge 1 and Charge 2 solids were added at ambient temperature. The temperature of the reaction mixture was gradually increased to 75° C. under a nitrogen blanket. At that temperature, about 5 percent of Charge 2 was added under agitation, followed by the addition of Charge 3. The reaction was then allowed to exotherm to 95° C. at which time the remainder of Charge 2 was added at a rate such that the temperature did not exceed 95° C. After completion of this addition, the reaction mixture was maintained at a temperature of 95° C. and held until the silicon hydride absorption band (Si—H, 2150 $cm^{-1}$) was no longer present in the infrared spectrum of the material.

EXAMPLE J

A colloidal silica dispersion was prepared from the following ingredients:

| Ingredients | Wt. in grams |
|---|---|
| Siloxane polyol of Example I | 701.1 |
| Colloidal silica[9] | 1001.7 |
| Methyl amyl ketone | 320.0 |

[9]MT-ST colloidal silica dispersion in methanol available from Nissan Chemical.

A suitable reactor equipped with an overhead stirrer, thermocouple, and $N_2$ inlet was set up for vacuum distillation and flushed with $N_2$. The above ingredients were then added to the flask and methanol distilled from the resulting mixture under reduced pressure at a temperature below 35° C. The distillation was continued until no addition distillate is obtained at a pressure of 70 mm Hg at 35° C.

EXAMPLE K

An acrylic polyol was prepared from the following ingredients:

| Ingredients | Wt. in grams |
|---|---|
| Charge 1 | |
| SOLVESSO 100[10] | 647.7 |
| CARDURA E[11] | 659.0 |
| Zinc octoate | 2.8 |
| Xylene | 431.8 |
| Charge 2 | |
| di-t-amyl peroxide | 45.9 |
| SOLVESSO 100 | 109.2 |
| Charge 3 | |
| Styrene | 690.0 |
| Hydroxyethyl methacrylate | 457.7 |
| 2-ethylhexyl acrylate | 276.0 |
| Acrylic acid | 217.4 |
| Charge 4 | |
| SOLVESSO 100 | 83.1 |

[10]Blend of aromatic solvents available from Exxon Chemicals America.
[11]Glycidyl ester of branched C10 saturated carboxylic acid available from Shell Chemical Co.

The ingredients of Charge 1 were added to a flask equipped with a reflux condenser, stirrer, thermocouple, and $N_2$ inlet and heated to reflux (164° C.). Charges 2 and 3 were started simultaneously; Charge 2 was added over 4.25 hours, and Charge 3 was added over 4 hours. The reaction was maintained at reflux throughout the addition of Charges 2 and 3. The reaction mixture was held at reflux temperature for 1 hour after the completion of Charge 3 and thinned with Charge 4. The resulting resin solution had a measured solids content (110° C., 1 hour) of 64.6%, a Gardner-Holt viscosity of Z3-, an acid value of 11.8, a number average molecular weight of 2852, and a weight average molecular weight 8589 as determined by gel permeation chromatography using a polystyrene standard.

Flexible Coating Examples

The following examples describe the preparation of a film-forming composition used as the transparent topcoat in a multi-component composite coating composition of the present invention. Coating examples 2, 3, and 5 contain the reaction product of Example A. Comparative examples 1 and 4 do not, but rather contain conventional aminoplast (melamine) crosslinking agents. The film-forming compositions were prepared from a mixture of the following ingredients under agitation in the order in which they appear:

| Ingredients | Comparative Example | | Example 2 | | Example 3 | |
|---|---|---|---|---|---|---|
| | Solid Weight in Grams | Total Weight in Grams | Solid Weight in Grams | Total Weight in Grams | Solid Weight in Grams | Total Weight in Grams |
| Methyl acetate | — | 13.4 | — | 13.4 | — | 13.4 |
| n-butyl alcohol | — | 8.6 | — | 8.6 | — | 8.6 |
| Xylene | — | 1.3 | — | 1.3 | — | 1.3 |
| Butyl acetate | — | 6.0 | — | 6.0 | — | 6.0 |
| DMPA glycol ether acetate[1] | — | 5.3 | — | 5.3 | — | 5.3 |
| Chisorb 328[2] | 3.2 | 3.2 | 3.2 | 3.2 | 3.2 | 3.2 |
| Flow control agent[3] | 2.1 | 4.7 | 2.1 | 4.7 | 2.1 | 4.7 |
| CYMEL 1130[4] | 20.3 | 20.3 | — | — | — | — |
| MR-225[5] | 5.4 | 8.3 | — | — | — | — |
| Flow control agent[6] | 8.2 | 20.0 | 8.2 | 20.0 | 8.2 | 20.0 |
| Polybutyl acrylate solution[7] | 0.25 | 0.4 | 0.25 | 0.4 | 0.25 | 0.4 |
| Surface tension modifier[8] | 0.015 | 0.15 | 0.015 | 0.15 | 0.015 | 0.15 |
| Anti silk agents[9] | 0.003 | 0.5 | 0.003 | 0.5 | 0.003 | 0.5 |
| Neutralized HALS solution[10] | 0.8 | 1.7 | 0.8 | 1.7 | 0.8 | 1.7 |
| Catalyst solution[11] | 1.5 | 2.1 | 1.5 | 2.1 | 1.5 | 2.1 |
| Diisopropanol amine (50% in ethanol) | — | 1.0 | — | 1.0 | — | 1.0 |
| Carbamate functional acrylic polymer of Example G | 13.5 | 21.4 | 13.5 | 21.4 | 13.5 | 21.4 |
| Carbamate functional polyester polymer of Example F | 31.1 | 43.2 | 31.1 | 43.2 | 39.8 | 55.3 |
| Carbamate functional polyether polymer of Example H | 20 | 20.0 | 20 | 20.0 | — | — |
| Acrylic polyol[12] | 3.0 | 4.5 | 3.0 | 4.5 | — | — |
| Reaction product of Example A | — | — | 25.7 | 49.0 | 40.0 | 68.1 |

[1]DMPA glycol ether acetate solvent available from DOW Chemical
[2]Substituted benzotriazole UV light stabilizer available from Chitec Chemical Co.
[3]Polymeric microparticle prepared in accordance with example 11 of U.S. Pat. No. 4,147,688
[4]Fully alkylated melamine-formaldehyde aminoplast resin available from Cytec Industries, Inc.
[5]Polymeric alkylated melamine-formaldehyde aminoplast resin available from Solutia
[6]Dispersion of 7.7% Aerosil R812 silica (available from Degussa) in acrylic polyol 'd'
[7]A flow modifier having a Mw of about 6700 and Mn of about 2600 made in xylene at 62.5% solids
[8]10% Baysilone OL 17, available from Bayer Corporation, in 2-methoxy propyl acetate
[9]0.5% DC200 100CS silicone, available from Dow Corning, in xylene
[10]Solution of 25% Tinuvin 292, available from Ciba-Geigy Corporation, 24.5% dodecyl benzene sulfonic acid, 40% isobutyl alcohol, and 10.5% isopropyl alcohol
[11]Dodecyl benzene sulfonic acid solution
[12]Acrylic polyol of composition (40 Hydroxypropyl acrylate/20 styrene/19 butyl acrylate/18.5 butyl methacrylate/2 acrylic acid/0.5 methyl methacrylate); 67% solids; Mw = 7,000

|  | Comparative Example 4 | | Example 5 | |
| --- | --- | --- | --- | --- |
| Ingredients | Solid Weight in Grams | Total Weight in Grams | Solid Weight in Grams | Total Weight in Grams |
| Acetone | — | 20.0 | — | 20.0 |
| Ethyl-3-ethoxy propionate | — | 30.0 | — | 30.0 |
| 2-methoxy propyl acetate | — | 15.0 | — | 15.0 |
| Tinuvin 328[1] | 3.0 | 3.0 | 3.0 | 3.0 |
| Tinuvin 292[2] | 05 | 0.5 | — | — |
| Tinuvin 123[3] | 0.6 | 0.6 | 1.1 | 1.1 |
| Surface tension modifier[4] | 0.04 | 0.24 | 0.04 | 0.24 |
| Surface tension modifier[5] | 0.03 | 0.13 | 0.03 | 0.13 |
| Acrylic polyol[6] | 53.7 | 89.5 | 53.7 | 89.5 |
| Polyester polyol[7] | 5.0 | 6.3 | 5.0 | 6.3 |
| Silica dispersion of Example J | 7.1 | 9.4 | 7.1 | 9.4 |
| Cymel 202[8] | 15.0 | 18.8 | — | — |
| Reaction product of Example A | — | — | 15.0 | 25.6 |
| The following were added and mixed within 5 minutes prior to application: | | | | |
| Desmodur N-3300[9] | 21.3 | 21.3 | 21.3 | 21.3 |
| Phenyl acid phosphate[10] | 1.0 | 1.3 | 1.0 | 1.3 |

[1]Substituted benzotriazole UV light stabilizer available from Ciba Geigy Corporation
[2]Sterically hindered amine light stabilizer available from Ciba Geigy Corporation
[3]Sterically hindered amine light stabilizer available from Ciba Geigy Corporation
[4]Solution of BYK 310 (available from BYK Chemie), 15% in 2-methoxy propyl acetate
[5]Solution of BYK 307 (available from BYK Chemie), 25% in 2-methoxy propyl acetate
[6]Acrylic polyol: (1.0% methacrylic acid/23.4% 2-ethylhexyl methacrylate/20.8% 2-ethylhexyl acrylate/20% styrene/34.8% hydroxyethylmethacrylate) 60% in 46.4:46.0:7.6 DOWANOL PM acetate/butyl acetate/odorless mineralspirits, hydroxyl value = 90 on solution, Gardner-Holt = T
[7]Polyester polyol: (32% 4-methyl hexahydrophthalic anhydride/22.9% 1,6 hexane diol/18.6% trimethylol propane/18.4% adipic acid/8.1% trimethyl pentane diol), 80% in 60:40 butyl acetate/Solvesso 100, hydroxyl value = 145, Gardner-Holt viscosity = X – Z
[8]Partially alkylated melamine-formaldehyde aminoplast resin available from Cytec Industries
[9]Polyisocyanate resin available from Bayer Corporation
[10]Phenyl acid phosphate solution available from Rhodia Test Panel Preparation MPP4100D, high solids adhesion promoter commercially available from PPG Industries, Inc., was applied to Sequel 1440 TPO plaques, commercially available from Standard Plaque (4 inches×12 inches; 10.16 cm×30.48 cm), by hand spraying at a dry film thickness of 0.15 mils to 0.25 mils (3.8 microns to 6.4 microns). Each Sequel 1440 plaque was cleaned with isopropyl alcohol prior to being promoted. The promoted Sequel 1440 plaques sat for up to one day before a solventborne black base coat commercially available from PPG Industries, Inc., CBCK8555A, was applied at a dry film thickness of 0.8 mils to 1.2 mils (20.3 microns to 30.5 microns). The base coat was applied by Spraymation® in two coats with a 90 second "flash" at ambient temperatures between each coat. For Examples 1, 2, and 3, the base coated panels were baked for 10 minutes at 254° F. (123.3° C.) prior to application of the transparent topcoats described in the above examples. For examples 4 and 5, the base coated panels sat at ambient temperature for 90 seconds before the transparent topcoats described in the above flexible examples were applied. Application of the transparent topcoats was by Spraymation® in two coats with a 90-second ambient flash between each coat. The transparent topcoats had a dry film thickness between 1.5 mils and 2.0 mils (40.6 microns to 45.7 microns). The top coated panels were allowed to sit at ambient temperature for 10 minutes and then were thermally cured at 254° F. (123.3° C.) for 40 minutes. The coated test panels sat at ambient temperature for a minimum of four days prior to testing.

The test panels coated with flexible examples 1 through 5 were evaluated for flexibility, acid etch resistance, and photo-oxidative degradation rate. Flexibility was evaluated at 70° F. (21.1° C.). For flex testing, a 1-inch by 4-inch (2.54 cm×10.16 cm) piece was cut from the coated test panel. The piece was subjected to a bend around a ½ inch (1.27 cm) diameter steel mandrel, such that the two ends of the 4-inch long (10.16 cm) test piece contacted one another. The rating scale is from 0 to 10. A '10' consists of no paint cracking. A '9' has less than five interrupted short line cracks. An '8' has interrupted line cracks with a maximum of four uninterrupted line cracks. A '6' has five to ten uninterrupted line cracks. A '4' has more than 15 uninterrupted line cracks. A '0' is fracture of the substrate.

Acid etch resistance was measured by exposing a 4"×8" (10.16 cm×20.32 cm) coated test panel in Jacksonville, Fla. from the last week of May through the last week of August 2001. Upon exposure completion, the panels were hand washed with soap and water, and then rinsed with water. The rinse water was removed by squeegee, and then the panels were allowed to dry at room temperature. The panels were rated on a scale of 0 (outstanding) to 10 (severe etching) against a set of reference standards comparable to those used by General Motors.

Photo-oxidation rate is a measure of how rapidly an organic coating photo-oxidatively degrades. The higher the numerical rating, the more rapidly the coating photo-oxidatively degrades. The panels were tested according to Ford Motor Company's Exterior Paint Weathering Test Method PA-0148, DVM-5867. Results are shown on the following table.

| EXAMPLE | Flexibility | Acid Etch | Photo-oxidation Rate 1000 hrs Weatherometer |
| --- | --- | --- | --- |
| Comparative Example 1 | 10 | 10 | 0.648 |
| Example 2 | 10 | 10 | 0.369 |
| Example 3 | 10 | 5 | 0.250 |
| Comparative Example 4 | 8 | 7 | 0.467 |
| Example 5 | 8 | 6 | 0.286 |

The data in the table illustrate that compositions prepared in accordance with the present invention demonstrate acid etch and flexibility properties comparable or superior to analogous conventional compositions containing aminoplast resins as the crosslinking agent. Particularly notable is the improved photo-oxidation rate of the compositions of the present invention, as well as the flexibility of the composition of example 3, despite the lack of polyether resin therein.

The following examples describe the preparation of a film-forming composition used as the transparent topcoat in a multi-component composite coating composition of the present invention. Comparative example 6 contains a commercially available aminoplast crosslinking agent. Comparative example 7 contains a commercially available aminoplast and a commercially available triazine compound. The compositions of examples 8 and 9 were prepared in accordance with the present invention. Coating example 8 contains a commercially available aminoplast and the reaction product of Example C. Coating example 9 contains a commercially available aminoplast, a commercially available triazine compound, and the reaction product of Example C. Clear film-forming compositions were prepared by mixing together the following ingredients:

tions of examples 6–9 were each applied to a base coated panel in two coats with a 60 seconds flash time at 75° F. (23.9° C.) allowed between coats. The composite coating was allowed to air flash at 75° F. (23.9° C.) for 10 minutes before baking at 285° F. (140.6° C.) to cure both the base coat and clearcoat. The panels were baked in a horizontal position. The colored panel for each clearcoat example was baked for 30 minutes and used to test for properties. The dry film thickness ranges for the base coat and clearcoat were

| Ingredients | Comparative Example 6 | | Comparative Example 7 | | Example 8 | | Example 9 | |
|---|---|---|---|---|---|---|---|---|
| | Solid Weight in Grams | Total Weight in Grams | Solid Weight in Grams | Total Weight in Grams | Solid Weight in Grams | Total Weight in Grams | Solid Weight in Grams | Total Weight in Grams |
| Xylene | — | 10 | — | 10 | — | 10 | — | 10 |
| Ethyl 3-Ethoxy propionate | — | 3.5 | — | 3.5 | — | 3.5 | — | 3.5 |
| Aromatic 150[1] | — | 5.6 | — | 5.6 | — | 5.6 | — | 5.6 |
| 2-Butoxy ethanol acetate | — | 1.8 | — | 1.8 | — | 1.8 | — | 1.8 |
| Butyl carbitol[2] | — | 2.9 | — | 2.9 | — | 2.9 | — | 2.9 |
| Butyl ether diethylene glycol acetate | — | 3.5 | — | 3.5 | — | 3.5 | — | 3.5 |
| Aromatic100[3] | — | 4 | — | 4 | — | 4 | — | 4 |
| Tinuvin 928[4] | 1 | 1 | 1 | 1 | 1 | 1 | 1 | 1 |
| Irganox 1010[5] | 0.23 | 0.23 | 0.23 | 0.23 | 0.23 | 0.23 | 0.23 | 0.23 |
| Tinuvin 400[6] | 0.83 | 0.98 | 0.83 | 0.98 | 0.83 | 0.98 | 0.83 | 0.98 |
| Tinuvin 292[7] | 0.80 | 0.80 | 0.80 | 0.80 | 0.80 | 0.80 | 0.80 | 0.80 |
| Worlee Additive 315[8] | 0.06 | 0.60 | 0.06 | 0.60 | 0.06 | 0.60 | 0.06 | 0.60 |
| Rheology Control Agents[9] | 25 | 41.6 | 25 | 41.6 | 23 | 38.3 | 25 | 41.6 |
| Catalyst Solution[10] | 0.50 | 0.70 | 0.50 | 0.70 | 1.0 | 1.4 | 0.50 | 0.70 |
| Setamine US 138[11] | 34 | 48.6 | 29 | 42.9 | 27 | 38.6 | 29 | 41.4 |
| Acrylic Polyol of Example K | 41 | 64.1 | 41 | 64.1 | 36 | 56.3 | 41 | 64.1 |
| TACT[12] | — | — | 5 | 9.7 | — | — | 2.5 | 4.9 |
| Reaction product of Example C | — | — | — | — | 14 | 34.1 | 2.5 | 6.1 |

[1]Blend of aromatic solvents available from Exxon Chemicals America.
[2]Diethylene glycol monobutyl ether available from Union Carbide Chemicals and Plastics Co., Inc.
[3]Blend of aromatic solvents available from Exxon Chemicals America
[4]Substituted benzotriazole UV Light stabilizer available from Ciba Geigy Corporation.
[5]Anti-oxidant available from Ciba Specialty Chemicals Corporation.
[6]Substituted triazine UV Light stabilizer available from Ciba Geigy Corporation.
[7]Sterically hindered amine light stabilizer available from Ciba Geigy Corporation.
[8]Flow additive available from Worlee Chemie.
[9]Sag control agent available from Akzo Nobel.
[10]Dodecyl benzene sulfonic acid solution
[11]A partially alkylated butoxy functional aminoplast available from Akzo Nobel.
[12]Tris (alkyl carbamoyl) triazine available from Cytec Industries, Inc.

Clearcoat formulations examples 6–9 were reduced with Aromatic 100 by weight to 28" #4 Ford at room temperature (71° F.–75° F., 21.7° C.–23.9° C.). The film-forming compositions of examples 6–9 were applied to pigmented base coats to form color-plus-clear composite coatings over a steel substrate with electrocoat primer and primer surfacer. The base coat used for the examples is commercially available from PPG Industries, Inc. and is identified as 259502 (black). The primer used is commercially available from PPG Industries, Inc. and is identified as 1177-422AR. The electrocoat used on the steel is commercially available from PPG Industries, Inc. and is identified as ED5000.

The base coat was applied in two coats to the primed electrocoated steel panels at a temperature of about 75° F. (23.9° C.). Approximately a 90 seconds flash time was allowed between the two base coat applications. After the second base coat application, a 3 minutes flash time was allowed at about 75° F. (23.9° C.) before the application of the clear coating composition. The clear coating composi- 0.5–0.6 mils (12.7–15.24 microns) and 1.5–1.6 mils (38.1–40.6 microns), respectively. The test panels coated with examples 6 through 9 were evaluated for appearance, Crockmeter mar resistance, acid etch resistance, and humidity resistance. The property data has been summarized in the following table.

Summary of Clearcoat Property Data

| | Comparative Example #6 | Comparative Example #7 | Comparative Example #8 | Example #9 |
|---|---|---|---|---|
| 20° Gloss | 94 | 94 | 92 | 98 |
| DOI | 94 | 95 | 93 | 96 |
| % Mar Retention[1] | 89 | 91 | 90 | 89 |

-continued

|  | Comparative Example #6 | Comparative Example #7 | Example #8 | Example #9 |
|---|---|---|---|---|
| Acid Resistance[2] | 74 | 86 | 84 | 73 |
| Humidity[3] | 2 | 2 | 3 | 3 |

[1]Mar resistance of coated panels was measured using the following method: Gloss of coated panels is measured with a MacBeth NOVOGLOSS Statistical 20 degree glossmeter. Coated panels are marred by applying ten double rubs to the surface using two-micron paper on a wool felt cloth using aCrockmeter ® mar tester (available from Atlas Electric Devices Company). The 20 degree gloss is read on the marred area of the panel after being washed with water and patted dry. The number reported is the percent gloss retention after marring; i.e., 100% x marred gloss/original gloss.
[2]Acid resistance was measured in terms of % 20 degree gloss retention. Prior to testing, 20 degree gloss measurements are recorded. A 5 centimeter PVC ring with a seal is placed on a clean panel surface. A solution containing sulfuric acid and iron sulfate (10 mL) is placed inside the PVC ring. A watch glass is placed over the PVC ring. The panel is placed on a 70° C. hot plate for 1 hour. After 1hour the watch glass and PVC ring are removed, the panel is rinsed with water, and the surface is wiped with mineral spirits. 20 degree gloss measurements are taken of the tested area. The % 20 degree gloss retention is recorded.
[3]Four days exposure at 140° F. on a QCT condensation tester (Q-Panel Company, Cleveland, OH). Panels were rated for blushing and blistering. Blush was rated on a scale of 0 to 5 (0 = no blush or color change, 5 = severe blush or color change.

The data in the table demonstrate that compositions prepared in accordance with the present invention exhibit outstanding gloss, DOI, and mar resistance. Other properties are at least comparable to coating compositions prepared with conventional aminoplast crosslinking agents.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

We claim:

1. A composition of matter comprising the structure:

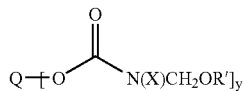

wherein Q is a multi-valent organic moiety containing isocyanurate functionality; X is H, —CH$_2$OH, or —CH$_2$OR'; R' is an alkyl or aryl group having from 1 to 12 carbon atoms; and y is at least 2.

2. The composition of claim 1, wherein Q has the structure:

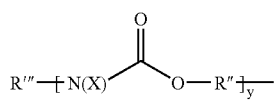

wherein R" is a divalent group and R''' is a residue of an isocyanurate.

3. A curable composition comprising:
   a) the composition of matter of claim 1; and
   b) at least one polymer having functional groups that are reactive with the composition of matter a).

4. The curable composition of claim 3, wherein the composition of matter a) is present in an amount of 1 to 99 percent by weight based on the total weight of resin solids in the curable composition.

5. The curable composition of claim 3, wherein the polymer is present in an amount of 1 to 99 percent by weight based on the total weight of resin solids in the curable composition.

6. The curable composition of claim 3, wherein the polymer has functional groups selected from the group consisting of hydroxyl, carboxylic acid, amide, thiol, urea, carbamate, thiocarbamate, and mixtures thereof.

7. The curable composition of claim 6, wherein the polymer is selected from the group consisting of acrylic, polyester, polyether and polyurethane polymers including mixtures thereof.

8. A curable composition comprising:
   a) the composition of matter of claim 1, present as a crosslinking agent in an amount of 1 to 99 percent by weight based on the total weight of resin solids in the curable composition; and
   b) a polymer having functional groups that are reactive with the crosslinking agent a) present in an amount of 1 to 99 percent by weight based on the total weight of resin solids in the curable composition.

9. The curable composition of claim 8, further comprising an auxiliary crosslinking agent, present in amounts of 1 to 50 percent by weight based on total weight of resin solids in the curable composition.

10. The curable composition of claim 9, wherein the auxiliary crosslinking agent is a polyisocyanate.

11. The curable composition of claim 10, wherein the auxiliary crosslinking agent is a polyisocyanate, wherein at least a portion of the isocyanate groups are capped.

12. The curable composition of claim 9, wherein the auxiliary crosslinking agent is an aminoplast.

13. The curable composition of claim 8, wherein the polymer of (b) is an acrylic polymer.

14. The curable composition of claim 8, wherein the crosslinking agent of a) is present in an amount of 1 to 50 percent by weight based on the total weight of resin solids in the curable composition.

15. The curable composition of claim 12, wherein the auxiliary aminoplast crosslinking agent is present in an amount of 1 to 35 percent by weight based on the total weight of resin solids in the curable composition.

16. The curable composition of claim 13, wherein the acrylic polymer is present in an amount of 20 to 85 percent by weight based on the total weight of resin solids in the curable composition.

17. The curable composition of claim 13, wherein the acrylic polymer has hydroxyl functional groups.

18. The curable composition of claim 17, wherein the acrylic polymer contains beta hydroxy ester groups.

19. The curable composition of claim 18, wherein the acrylic polymer is prepared from the following ingredients:
   1) 1 to 70 percent by weight of an ethylenically unsaturated, beta-hydroxy ester functional monomer;
   2) 5 to 50 percent by weight, based on the total solid weight of monomers used to prepare the polymer, of an ethylenically unsaturated, hydroxyalkyl functional monomer different from the beta-hydroxy ester functional monomer of 1);
   3) 0 to 40 percent by weight, based on the total solid weight of monomers used to prepare the polymer, of a vinyl aromatic monomer;

4) 0 to 60 percent by weight, based on the total solid weight of monomers used to prepare the polymer, of at least one alkyl ester of acrylic acid or methacrylic acid; and 5) 0 to 20 percent by weight, based on the total solid weight of monomers used to prepare the polymer, of at least one ethylenically unsaturated monomer different from 1), 2), 3), and 4) above.

20. The curable composition of claim 19, wherein the ethylenically unsaturated, beta-hydroxy ester functional monomer is selected from the group consisting of:
   a) a reaction product of an ethylenically unsaturated, epoxy functional monomer and a saturated carboxylic acid having 1 to 20 carbon atoms; and
   b) a reaction product of an ethylenically unsaturated acid functional monomer and an epoxy compound containing at least 4 carbon atoms which is not polymerizable with the ethylenically unsaturated acid functional monomer.

21. The curable composition of claim 19 in which 4) comprises up to 30 percent by weight based on total solid weight of monomers, of an alkyl ester of acrylic or methacrylic acid having 4 to 18 carbon atoms.

22. The curable composition of claim 20, wherein the ethylenically unsaturated, beta-hydroxy ester functional monomer is derived from an ethylenically unsaturated, epoxy functional monomer and a saturated carboxylic acid having 13 to 20 carbon atoms.

23. The curable composition of claim 22, wherein the ethylenically unsaturated, beta-hydroxy ester functional monomer is derived from glycidyl methacrylate and isostearic acid.

24. The curable composition of claim 20, wherein the ethylenically unsaturated, beta-hydroxy ester functional monomer is derived from an ethylenically unsaturated acid functional monomer and an epoxy compound containing at least 4 carbon atoms which is not polymerizable with the ethylenically unsaturated acid functional monomer.

25. The curable composition of claim 20, wherein the ethylenically unsaturated, beta-hydroxy ester functional monomer is present in the polymer in an amount of about 20 to about 55 percent by weight, based on the total solid weight of monomers used to prepare the polymer.

26. The curable composition of claim 24, wherein the ethylenically unsaturated, acid functional monomer is selected from the group consisting of acrylic acid, methacrylic acid, methacrylic anhydride, itaconic acid, and mixtures thereof.

27. The curable composition of claim 24, wherein the epoxy compound has the following structure

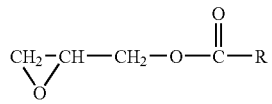

wherein R is a hydrocarbon radical containing from 4 to 26 carbon atoms.

28. The curable composition of claim 27, wherein R is a tertiary aliphatic group of 8 to 10 carbon atoms.

29. The curable composition of claim 19, wherein the ethylenically unsaturated, hydroxyalkyl functional monomer of 2) is selected from the group consisting of hydroxyethyl acrylate, hydroxyethyl methacrylate, hydroxypropyl acrylate, hydroxypropyl methacrylate, 4-hydroxybutyl acrylate, 4-hydroxybutyl methacrylate, adducts of caprolactone and hydroxyalkyl acrylates and methacrylates and mixtures thereof.

30. The curable composition of claim 29, wherein the ethylenically unsaturated, hydroxyalkyl functional monomer is hydroxyethyl methacrylate, present in an amount of about 10 to about 30 percent by weight, based on the total solid weight of monomers used to prepare the polymer.

31. The curable composition of claim 21, wherein component 4) is selected from the group consisting of n-butyl acrylate, t-butyl acrylate, 2-ethylhexyl acrylate, isobornyl acrylate, cyclohexyl acrylate, t-butyl cyclohexyl acrylate, trimethyl cyclohexyl acrylate, lauryl acrylate, n-butyl methacrylate, t-butyl methacrylate, 2-ethylhexyl methacrylate, isobornyl methacrylate, cyclohexyl methacrylate, t-butyl cyclohexyl methacrylate, trimethyl cyclohexyl methacrylate, lauryl methacrylate, and mixtures thereof.

32. The curable composition of claim 19, wherein the acrylic polymer contains carbamate functionality.

33. The curable composition of claim 19, wherein the vinyl aromatic monomer is present in the acrylic polymer in an amount of about 15 to about 35 percent by weight, based on the total solid weight of monomers used to prepare the polymer.

34. The curable composition of claim 8, further comprising an additional polyol polymer different from the polymer b), selected from acrylic polymers, polyester polymers, polyurethane polymers, and mixtures thereof.

35. The curable composition of claim 34, wherein the additional polyol polymer is present in an amount of up to 30 percent by weight based on the total weight of resin solids in the curable composition.

36. The curable composition of claim 35, wherein the additional polyol polymer is a polyester polymer.

37. A curable composition comprising
   (a) composition of matter comprising the structure:

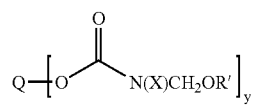

wherein Q is a multi-valent organic moiety containing urethane linkages; X is H, —CH$_2$OH, or —CH$_2$OR'; R' is an alkyl or aryl group having from 1 to 12 carbon atoms; and y is at least 2; and
   (b) at least one polymer having functional groups that are reactive with the composition of matter (a), wherein the polymer has functional groups selected from hydroxyl, carboxylic acid, amide, thiol, carbamate, and/or thiocarbamate.

* * * * *